(12) United States Patent
Moniwa et al.

(10) Patent No.: US 8,877,049 B2
(45) Date of Patent: Nov. 4, 2014

(54) WATER TREATMENT EQUIPMENT (71) Applicant: Kabushiki Kaisha Toshiba, Tokyo (JP)

(72) Inventors: Shinobu Moniwa, Kawasaki (JP);
Hidetaki Shiire, Tokyo (JP); Satomi Ebihara, Tokyo (JP); Masahiko Tsutsumi, Fuchu (JP); Nobuyuki Ashikaga, Kawasaki (JP); Satoshi Haraguchi, Kodaira (JP); Akiko Suzuki, Tokyo (JP); Hideyuki Tsuji, Yokohama (JP); Tatsuoki Kohno, Tokyo (JP); Kazuhiko Noda, Hino (JP); Katsuya Yamamoto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/893,079

(22) Filed: May 13, 2013

(65) Prior Publication Data
US 2013/0248432 A1 Sep. 26, 2013

Related U.S. Application Data (62) Division of application No. 12/790,087, filed on May 28, 2010, now abandoned.

(30) Foreign Application Priority Data

May 29, 2009 (JP) ................. 2009-131569

(51) Int. Cl.
C02F 1/28 (2006.01)
B01J 20/34 (2006.01)
C02F 1/58 (2006.01)
C01B 25/00 (2006.01)
B01J 20/04 (2006.01)
C02F 101/10 (2006.01)

(52) U.S. Cl.
CPC .............. *C02F 1/58* (2013.01); *B01J 20/3475* (2013.01); *C02F 2303/16* (2013.01);
(Continued)

(58) Field of Classification Search
USPC ............. 210/190, 191, 195.3, 207, 208, 269, 210/275, 277, 436, 502.1, 906, 202, 253, 210/259
See application file for complete search history.

(56) References Cited

U.S. PATENT DOCUMENTS 2,101,961 A    12/1937  Slidell
3,240,699 A *  3/1966  Duff et al. ................. 521/26
(Continued)

FOREIGN PATENT DOCUMENTS

CN    101119934 A    2/2008
JP    2006-346555    12/2006
(Continued)

OTHER PUBLICATIONS

U.S. Appl. No. 12/789,947, filed May 2010, Moniwa et al.
(Continued)

*Primary Examiner* — Matthew O Savage
(74) *Attorney, Agent, or Firm* — Finnegan, Henderson, Farabow, Garrett & Dunner, LLP (57) ABSTRACT According to one embodiment, water to be treated is passed through each of a first reactor vessel and second reactor vessel, phosphorus contained in the water is removed by using an adsorbent, thereafter the liquid held in each of the reactor vessels is discharged from each of a first treated water discharge path and second treated water discharge path, and thus the influence of soluble impurities derived from the water is eliminated. Further, when suspended solids impurities contained in the water are accumulated in the phosphorus adsorbent, the accumulated impurities are eliminated by a reverse cleaning operation using a liquid to be thereafter introduced from a reactor vessel liquid introduction path into the reactor vessel, and hence the influence of the suspended solids in the water on a desorption agent liquid to be thereafter introduced into a crystallization vessel, and containing phosphorus from the phosphorus adsorbent is eliminated.

6 Claims, 3 Drawing Sheets (52) U.S. Cl.
CPC .............. *C01B 25/00* (2013.01); *B01J 2220/56* (2013.01); *B01J 20/048* (2013.01); *C02F 1/285* (2013.01); *C02F 2101/105* (2013.01); *C02F 2301/046* (2013.01); *Y10S 210/906* (2013.01)
USPC ........ 210/190; 210/195.3; 210/202; 210/208; 210/253; 210/259; 210/269; 210/502.1; 210/906

(56) References Cited

U.S. PATENT DOCUMENTS

| | | | |
|---|---|---|---|
| 4,477,355 | A | 10/1984 | Liberti et al. |
| 6,136,199 | A | 10/2000 | SenGupta et al. |
| 7,588,744 | B1 | 9/2009 | Sylvester |
| 2006/0144780 | A1 * | 7/2006 | Jensen et al. ................... 210/435 |
| 2007/0241041 | A1 | 10/2007 | Shimamura et al. |
| 2009/0048103 | A1 | 2/2009 | Suzuki et al. |
| 2009/0238746 | A1 | 9/2009 | Shiire et al. |
| 2010/0300949 | A1 | 12/2010 | Moniwa et al. |

FOREIGN PATENT DOCUMENTS

| | | |
|---|---|---|
| JP | 2008-073662 A | 4/2008 |
| JP | 2009-056457 | 3/2009 |
| JP | 2009-226250 | 10/2009 |
| WO | WO 9003947 A | 4/1990 |
| WO | WO 2010/143383 | 12/2010 |

OTHER PUBLICATIONS

Notification of the Third Office Action issued by the State Intellectual Property Office of the People's Republic of China on Apr. 7, 2013, in a counterpart Chinese Application No. 201010194852.0.

* cited by examiner

WATER TREATMENT EQUIPMENT

CROSS-REFERENCE TO RELATED APPLICATIONS

This application is a division of prior application Ser. No. 12/790,087, filed May 28, 2010, which is based upon and claims the benefit of priority from Japanese Patent Application No. 2009-131569, filed May 29, 2009; the entire contents of all of which are incorporated herein by reference.

FIELD

Embodiments described herein relate generally to a water treatment equipment configured to recover phosphorus contained in the wastewater to be treated, and more particularly, to a water treatment equipment configured to treat the water discharged from a treatment process of excess sludge discharged from biological wastewater treatment such as an activated sludge process, and the like used for industrial wastewater treatment such as sewerage, a food-processing plant, and the like, and still more particularly, to a water treatment equipment configured to recover/recycle phosphorus contained in the wastewater to be treated.

BACKGROUND

At present, future worldwide phosphorus resources exhaustion is predicted, and from the domestic conditions that securement of phosphorus resources is dependent on importation, attention is paid to the technique for recovering phosphorus contained in the wastewater.

Heretofore, as for phosphorus in the wastewater, discharge of phosphorus into the environment system is a factor of eutrophication, hence removal of phosphorus and discharge state management thereof have been regarded as indispensable, and thus efforts have been concentrated mostly on the phosphorus removing technique. As representative phosphorus removing techniques, there are the biological phosphorus removing method utilizing phosphorus-accumulation capability of microorganism, and phosphorus removing method based on the coagulating sedimentation.

In order to use these phosphorus removing methods as direct phosphorus recovery/utilization means, for example, processes of incineration, chemical treatment, and the like of excess sludge resulting from the biological phosphorus removing method have been required, and it has been necessary to use a large amount of chemical agents, and arrange a plurality of treatment processes. For example, in order to reuse the phosphorus as resources, it is also necessary to eliminate influences of the used chemical agents and impurities contained in the derived sludge, and hence adjustment and refinement processes of the phosphorus also become necessary. In view of these circumstances, attention is paid to a water treatment technique utilizing a phosphorus adsorbent configured to selectively adsorb phosphorus. Examples of a material used to selectively remove an anion include a phosphorus adsorbent in which an anion-exchange resin or hydrotalcite-like inorganic layered compound is basically used as an anion exchanger, and adsorbent in which various metals are basically used as an anion exchanger. Regarding methods of manufacturing these adsorbents, a phosphorus adsorbent formed by developing the material characteristics of the above adsorbents, and phosphorus recovery utilizing the phosphorus adsorbent, a large number of methods are proposed.

As an example of a phosphorus recovery system utilizing the above-mentioned adsorbents, there is a system disclosed in JP-A 2006-346555(KOKAI).

In JP-A 2006-346555(KOKAI), a wastewater treatment equipment provided with solubilization means, solid-liquid separation means, and phosphorus adsorption means of biologically-treated sludge is described.

In the wastewater treatment equipment of JP-A 2006-346555(KOKAI), the treated matter of the sludge solubilization means discharged by the sludge solubilization means is circulated with biological treatment means, and part of the treated matter is supplied to the phosphorus adsorption means through post-sludge separation means. Accordingly, depending on the form of the sludge separation means, the solid contents are removed and supplied to the phosphorus adsorption means. Although reduction in concentration of the phosphorus in the wastewater is enabled, replacement of the adsorbent, and reuse of desorbed phosphorus are exemplified for the case where phosphorus adsorption is saturated due to lowering of the adsorbent capability, and soluble impurities contained in the water to be treated of the phosphorus adsorbent remain in the phosphorus adsorption means provided with the phosphorus adsorbent. As a result of this, when the adsorbed phosphorus is desorbed from the adsorbent, the impurities of the phosphorus adsorbent contained in the water to be treated are mixed into the phosphorus liquid to be recovered. Accordingly, there is the problem that the exemplified recovery process of phosphate includes impurities.

Further, as another problem, there is the problem that in the phosphorus removal of the wastewater containing phosphorus, when an alkaline liquid configured to desorb phosphorus is passed after the phosphorus is adsorbed/removed with respect to impurities contained in the water to be treated containing phosphorus, the impurities contained in the water to be treated are mixed into the alkaline liquid used to desorb phosphorus in addition to the phosphorus desorbed by the alkaline liquid, and moved to the alkaline liquid which has been passed, and hence the impurities are mixed into the phosphorus recovery liquid.

An object of the embodiments is to provide a water treatment equipment configured to recover phosphorus by making the sludge-separated liquid discharged from a treatment process of sludge discharged from a biological water treatment process the water to be treated, separating the phosphorus contained in the water to be treated from the water by using an adsorbent, and preventing the impurities in the water to be treated from being mixed into the recovered phosphorus.

In general, according to one embodiment, a water treatment equipment comprising a reactor vessel including an absorbent packed bed filled with a phosphorus adsorbent configured to adsorb phosphorus contained in the water to be treated, an introduction path configured to introduce the water to be treated into the reactor vessel, a discharge path configured to discharge the water to be treated from which phosphorus has already been removed from the reactor vessel, water passing means for passing a phosphorus desorption agent liquid configured to desorb phosphorus from the phosphorus adsorbent which has already adsorbed phosphorus through the reactor vessel, phosphorus recovery means for acquiring phosphate from the phosphorus desorption agent liquid which has been subjected to the passing treatment, and an upward flow formation path connected to a lower part of the reactor vessel, and configured to upwardly introduce a liquid into the reactor vessel to form an upward flow after the

DETAILED DESCRIPTION

In general, according to one embodiment, certain embodiments will be described below with reference to the accompanying drawings.

(First Embodiment)

Figure 1:
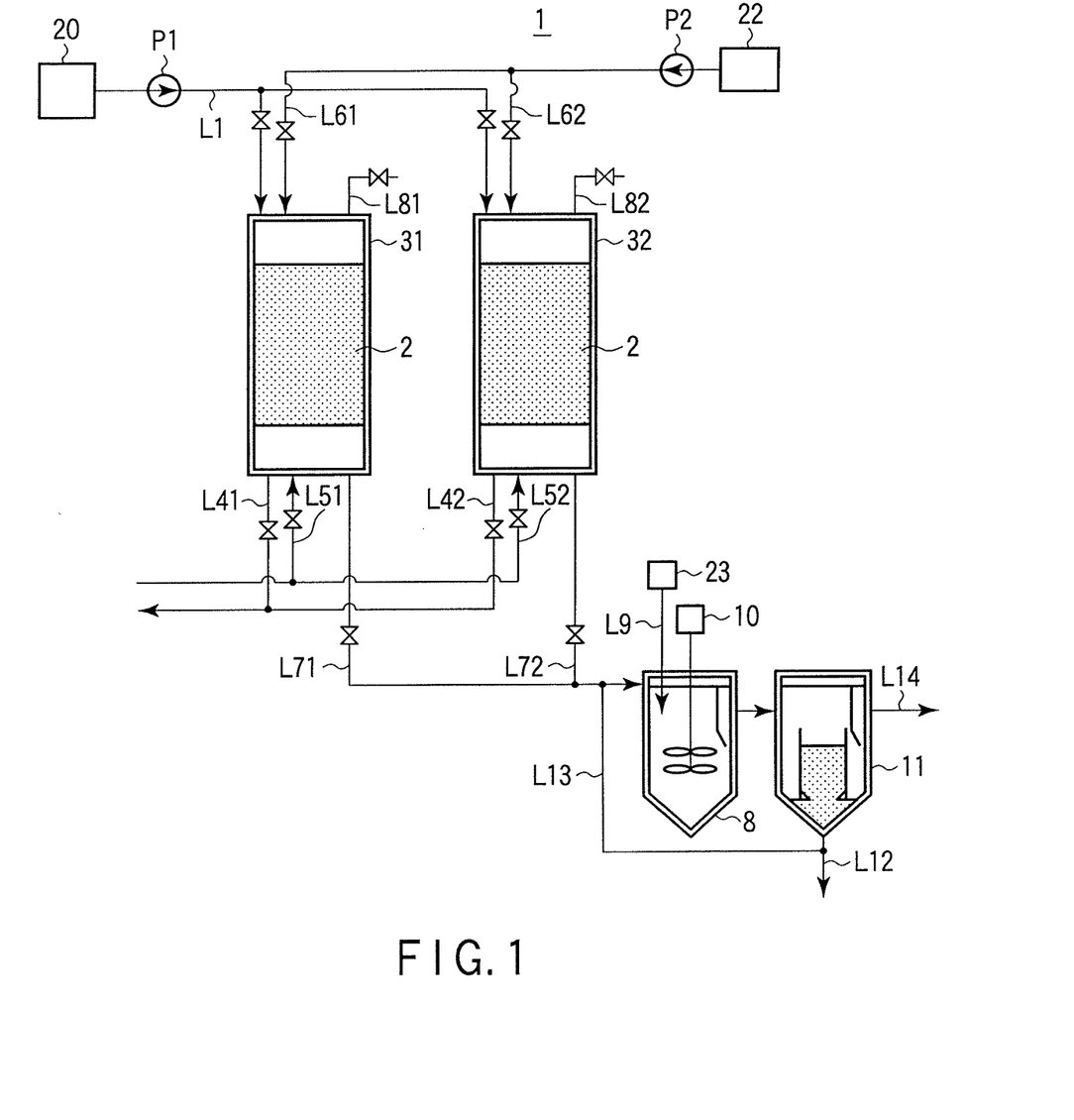
FIG. 1 is a configuration block diagram showing a water treatment equipment according to a first embodiment.

FIG. 1 is a configuration diagram showing example 1 of a water treatment equipment of the embodiment.

This water treatment equipment is applied to a water treatment equipment of a sludge-separated liquid discharged from a treatment process of excess sludge discharge from biological wastewater treatment such as an activated sludge process, and the like used for industrial wastewater treatment such as sewerage, a food-processing plant, and the like, and more particularly, to a water treatment equipment including a biological wastewater treatment process provided with a path for return to the biological water treatment process upstream side from which the sludge is derived.

The water to be treated is derived from the sludge-separated liquid obtained in the treatment process of the excess sludge. The treatment process of the excess sludge mentioned here includes all of a sludge concentration process, sludge dehydration process, and anaerobic digestion treatment. That is, the water to be treated is a mixture constituted of one or two or more of the sludge-separated liquid obtained from the sludge concentration process, sludge-separated liquid obtained from the sludge dehydration process, and sludge-separated liquid obtained from the anaerobic digestion treatment. Further, when applied to the sludge treatment process of the sewage treatment, the water to be treated is stable in the drainage water quantity and water quality, and hence can contribute to planned phosphorus recovery. The water to be treated is introduced into each of a first reactor vessel 31 and second reactor vessel 32 by the drive of a pump P1 through a path L1 from a raw water supply source 20. Each of the first to third reactor vessels 31 and 32 includes a packed bed 2 filled with an adsorbent.

Here, it is desirable that the phosphorus adsorbent be selected from materials in which an organic metal complex shown in, for example, JP-A 2009-56457(KOKAI) is employed as a base, capable of repetitively carrying out adsorption/desorption of phosphorus in a chemically reversible manner, having a wide range of selectivity of a desorption liquid used for desorption of phosphorus from the adsorbent after the adsorption of the phosphorus in the wastewater, and further capable of selectively adsorbing phosphorus. An example of the phosphorus adsorbent is a phosphorus adsorbent including a nitrogen-containing compound which is a high polymer (also including only a single amino group) and has one or two or more amino groups at an end of the structure, carrier carrying the above nitrogen-containing compound, and at least one metallic ion selected from a group constituted of a zinc ion, copper ion, ferric ion, and zirconium ion, and fixed to the nitrogen-containing compound. As the carrier, it is possible to use silica gel, alumina, glass, kaolin, mica, talc, clay, hydrated alumina, wollastonite, iron powder, potassium titanate, titanium oxide, zinc oxide, silicon carbide, silicon nitride, calcium carbonate, carbon, barium sulfate, boron, ferrite, and the like. The first and second reactor vessels 31 and 32 are operated in the fixed-bed state when the water to be treated is introduced into them. Further, in order to continuously remove phosphorus contained in the water to be treated, it is desirable that the first and second reactor vessels 31 and 32 be used in such a manner that while the water to be treated is flowing through any one of the first and second reactor vessels 31 and 32, a water-passing operation other than the passing operation of the water to be treated (for example, a reverse cleaning operation) is carried out in the other vessel.

The water to be treated is introduced into at least one of the first and second reactor vessels 31 and 32, phosphorus contained in the water is removed by using a phosphorus adsorbent, and the water is thereafter discharged from each of the first and second reactor vessels 31 and 32 through each of first and second treated water discharge paths L41 and L42. The water to be treated is introduced into the first and second reactor vessels 31 and 32 from the raw water supply source 20 through the path L1 by the drive of the pump P1, and the adsorbent in the packed bed 2 is caused to adsorb the phosphorus contained in the water to be treated. As for the adsorbent which has adsorbed the phosphorus, passing of the water to be treated is stopped, and thereafter the liquid held in each of the first and second reactor vessels 31 and 32 is discharged through each of the first and second treated water discharge paths L41 and L42. Vent paths L81 and L82 are provided at upper parts of the first and second reactor vessels 31 and 32, and hence the internal gas is discharged from each of the reactor vessels 31 and 32 through each of the vent paths L81 and L82, whereby discharge of the water to be treated from each of the reactor vessels 31 and 32 is promoted.

After the discharging of the liquid which has been held in each of the first and second reactor vessels 31 and 32 is completed, when the liquid is introduced into a lower part of each of the first and second reactor vessels 31 and 32 from each of first and second liquid introduction paths L51 and L52, the introduced liquid is brought into contact with the phosphorus adsorbent of the packed bed 2. Here, the liquid introduced into the lower part of each of the first and second reactor vessels 31 and 32 through each of the liquid introduction paths L51 and L52 causes neither deterioration in quality of the phosphorus adsorbent nor corrosion of the structural material of the water treatment equipment, contains an ingredient having capability of being adsorbed into the phosphorus adsorbent, and contains neither an ion component nor solid contents adversely affecting the subsequent processes. Further, when there is the possibility of the impurities contained in the water to be treated to be passed through the first and second reactor vessels 31 and 32 being accumulated in the phosphorus adsorbent, it is also possible to subject the adsorbent to reverse cleaning by using the liquid to be introduced through each of the first and second reactor vessel liquid introduction paths L51 and L52.

A desorption agent liquid supply source 22 is connected to each of the first and second reactor vessels 31 and 32 through each of two branch paths L61 and L62. A common path from the desorption agent liquid supply source 22 to the first and second reactor vessels 31 and 32 is furnished with a pump P2.

The liquid is introduced into each of the first and second reactor vessels 31 and 32 through each of the liquid introduction paths L51 and L52, the adsorbent adsorbs phosphorus contained in the water to be treated, and thereafter the desorption agent liquid is introduced from the agent liquid supply source 22 into each of the first and second reactor vessels 31 and 32 through each of the first and second desorption agent liquid introduction paths L61 and L62 by the drive of the pump P2. The phosphorus is desorbed from the phosphorus adsorbent by the desorption agent liquid. Further, the liquid containing the phosphorus derived from the water to be treated, and ingredient derived from the desorption agent liquid is discharged from each of the first and second reactor vessels 31 and 32 through each of first and second desorption agent liquid passing treatment water discharge paths L71 and L72. Here, it is desirable that the agent liquid to be introduced through each of the agent liquid introduction paths L61 and L62 be selected from ingredients having little effect on the characteristics of the adsorbent, equipment structure constituting the equipment, and crystallized phosphoric matter, and it is possible to use an ingredient exhibiting alkalinity such as aqueous sodium hydroxide, dilute hydrochloric acid, and the like. From the view point of purity maintenance of the crystallized phosphate matter of the agent liquid, it is particularly desirable that aqueous sodium hydroxide be used.

The phosphorus-containing liquid to be discharged from each of the first and second desorption agent liquid passing treatment water discharge paths L71 and L72 is introduced into a crystallization vessel 8. In the crystallization vessel 8, introduction of a crystallization agent liquid, and an agitation mixing operation using a stirrer 10 are carried out. The crystallization agent liquid is injected from a agent liquid supply source 23 into the crystallization vessel 8 through a path L9. As for the crystallization agent liquid mentioned here, it is desirable that an ingredient such as calcium salt or the like which forms a solid salt in cooperation with phosphorus be added, and it is more desirable that calcium hydroxide be used. Further, it is desirable that a seed crystal of hydroxyapatite or the like be previously and/or continuously supplied to the crystallization vessel 8. The continuous supply of the seed crystal may also be carried out in such a manner that part of the crystallized matter obtained by a crystallization solid-liquid separation vessel 11 configured to subject the crystallized matter of the liquid discharged from the crystallization vessel 8 to solid-liquid separation is supplied to the vessel 8 through a crystallized matter return path L13. Consequently, phosphorus is recovered as the crystallized matter discharged from the separation vessel 11 through a crystallized matter discharge path L12. That is, the crystallized matter produced in the crystallization solid-liquid separation vessel 11 becomes the recovered phosphoric matter used to recover phosphorus. It should be noted that the crystallization vessel 8 and crystallization solid-liquid separation vessel 11 may also be a single vessel into which the functions of both the vessels 8 and 11 are incorporated, or may be configured to be adapted to multistage processing.

Next, the function and advantage of the equipment 1 of this embodiment will be described below.

The water to be treated is a desorbed liquid discharged by the solid-liquid separation operation of the sludge, and normally contains therein suspended solids. Accordingly, in the process using an adsorbent, there is the possibility of the suspended solids being accumulated in the packed bed 2, and contamination of the adsorbent being caused. Further, in the adsorbent which is repetitively used, there is the possibility of the suspended solids being mixed into the process of the subsequent stage using the liquid discharged from the packed bed 2. Accordingly, a water treatment equipment which can eliminate impurities such as SS, and the like contained in the water to be treated, and in which the adsorbent can be repetitively utilized is required by the users. Thus, in the equipment 1 of this embodiment, the impurities, and the like are eliminated from the water to be treated by using the following method.

Firstly, the water to be treated is passed through each of the first and second reactor vessels 31 and 32, phosphorus contained in the water to be treated is removed by using the adsorbent, thereafter the liquid is discharged from the lower part of each of the first and second reactor vessels 31 and 32 through each of the first and second treated water discharge paths L41 and L42, and the adverse influence of the soluble impurities, and the like derived from the water to be treated is eliminated. As a result of this, the impurities such as SS and the like are prevented from being mixed into the desorption agent liquid (phosphorus-containing liquid) to be introduced from each of the first and second reactor vessels 31 and 32 into the crystallization vessel 8 through each of the paths L71 and L72.

Secondly, in the case where the suspended solids impurities contained in the water to be treated are accumulated in the adsorbent packed bed 2 when the water is passed through each of the first and second reactor vessels 31 and 32, the accumulated suspended solids impurities are eliminated by a reverse cleaning operation using the liquid to be introduced through each of the paths L51 and L52, and hence the influence of the suspended solids on the desorption agent liquid containing phosphorus from the phosphorus adsorbent, discharged from each of the first and second paths L71 and L72, and thereafter introduced into the crystallization vessel 8 is eliminated. In addition to the impurities elimination operation, it is possible to maintain the configuration of the recovered phosphoric matter by always retaining the seed crystal of the phosphate targeted in the crystallization vessel 8.

In the equipment of this embodiment, the water to be treated containing phosphorus is introduced into the reactor vessel filled with the phosphorus adsorbent, phosphorus is captured in the phosphorus adsorbent, thereafter the treated water from which the phosphorus has already been removed and which is held in the reactor vessel is discharged from the discharge path, whereby the treated water which contains impurities derived from the water to be treated and which has already been subjected to phosphorus adsorption is discharged. As a result of this, it is possible to reduce the concentration of the impurities held in the reactor vessel in which the phosphorus adsorbent that has adsorbed phosphorus is retained.

Further, by introducing the liquid into the reactor vessel by the upward flow, it is possible to eliminate the gaseous phase remaining in the adsorbent packed bed in the reactor vessel. As a result of this, the contact between the phosphorus desorption agent liquid to be thereafter introduced into the reactor vessel, and the phosphorus desorption agent liquid at the water passing means is made uniform, and it is possible to efficiently desorb the phosphorus captured in the phosphorus adsorbent therefrom. By these means, in the phosphorus recovery to be carried out by the crystallization means for acquiring the phosphate of the passing treatment water of the phosphorus desorption agent liquid, by making the passing treatment water of the phosphorus desorption agent liquid which contains little impurities, and is stable the water to be treated, it is possible to reduce the amount of impurities caused in the crystallization means for acquiring the phosphate which is the recovered phosphoric matter, and prevent the impurities from being mixed into the recovered phosphoric matter, and hence it is possible to appropriately carry out recovery of phosphorus from the wastewater. Incidentally, in the system in which the liquid of the downward flow is introduced into the reactor vessel, the gaseous phase remaining in the adsorbent packed bed in the reactor vessel cannot be effectively removed.

Alternatively, by using reverse cleaning means as the means for introducing the liquid of the upward flow, it is possible to prevent the impurities from being mixed into the phosphorus-desorbed liquid which has already been subjected to water passing, and is discharged by the phosphorus desorption means. As a result of this, the amount of impurities mixed into the crystallization means for acquiring the recovered phosphoric matter (phosphate) is reduced, and it is possible to prevent the impurities from being mixed into the recovered phosphoric matter.

By making the phosphorus desorption agent liquid used by the phosphorus desorption means the alkaline agent liquid, it is possible to prevent anion impurities other than the anion derived from the phosphorus from being mixed into phosphorus-desorbed liquid which has already been subjected to water passing, and is discharged by the phosphorus desorption means. As a result of this, the amount of anion impurities mixed into the crystallization means for acquiring phosphate is reduced, and it is possible to prevent the impurities from being mixed into the recovered phosphoric matter.

Further, the crystallization means is made the means for bringing the passing-treated water of the phosphorus desorption agent liquid into contact with hydroxyapatite and a calcium hydroxide liquid, whereby it is possible to appropriately carry out recovery of the crystallized phosphorus as hydroxyapatite in which in the crystallization means, the hydroxyapatite is made the crystalline nucleus, passing-treated water of the phosphorus desorption agent liquid is made the phosphorus source, and calcium hydroxide liquid is made the calcium source.

A plurality of reactor vessels each of which is filled with the phosphorus adsorbent are arranged, phosphorus in the water to be treated is continuously removed/recovered by switching of the to-be-passed water, thus the phosphorus is continuously recovered from the wastewater without providing a storage tank or the like, whereby it is possible to prevent the influence of the phosphorus load variation in the phosphorus recovery equipment from being exerted on the wastewater treatment facilities positioned on the upstream side which is the water to be treated source, and carry out phosphorus removal/recovery in a stable state.

The advantage of applying the water treatment equipment of this embodiment to the wastewater discharged from the treatment process of the excess sludge will be described below.

Normally, the sludge-separated liquid discharged from the treatment process is returned to the upstream side of the biological wastewater treatment process from which the sludge is derived. As a result of this, it is possible to reduce the risk of water contamination concomitant with the variation in the phosphorus concentration in the effluent discharged from the overall treatment system to the outside of the system as compared with the case where a water treatment equipment configured to recycle phosphorus is applied to the inflow water to the overall treatment system or to the outflow water part from the overall treatment system.

That is, according to the equipment of this embodiment, it becomes possible to carry out phosphorus removal by repetitively utilizing the phosphorus adsorbent, and phosphorus recovery in which impurities are prevented from being mixed into the recovered phosphorus while eliminating the influence of the impurities contained in the water to be treated, and hence it is possible to efficiently and appropriately carry out the operation of recovering phosphorus from the wastewater.

(Second Embodiment)

Figure 2:
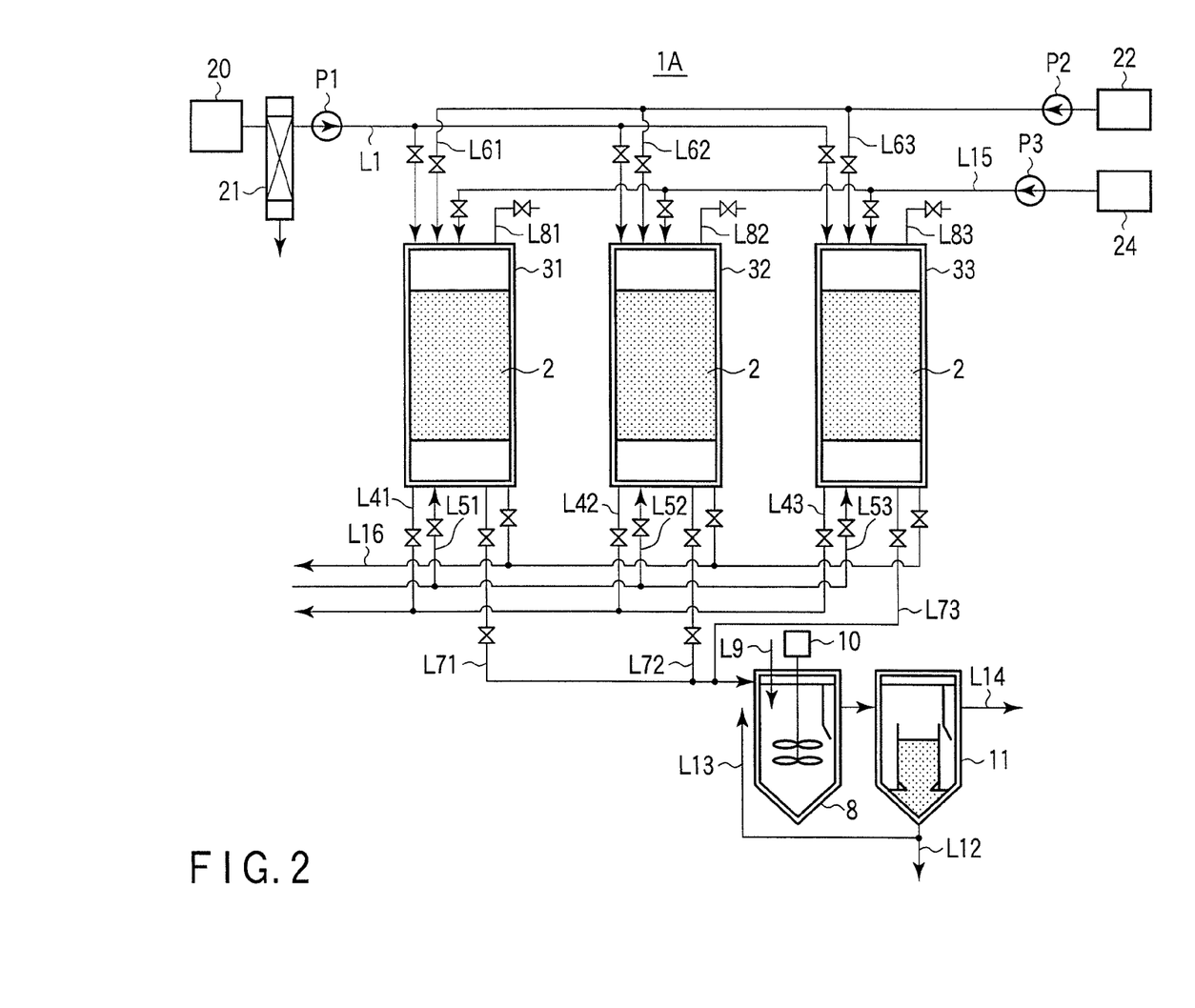
FIG. 2 is a configuration block diagram showing a water treatment equipment according to a second embodiment.

Next, an equipment of a second embodiment will be described below with reference to FIG. 2. It should be noted that a description of parts of this embodiment overlapping the embodiment described previously will be omitted.

A water treatment equipment 1A of this embodiment further comprises a third reactor vessel 33, third treated water discharge path L43, third reactor vessel liquid introduction path L53, third desorption agent liquid introduction path L63, third desorption agent liquid passing treatment water discharge path L73, regeneration agent liquid introduction path L15, regeneration treatment water discharge path L16, and solid-liquid separation unit 21.

The third reactor vessel 33 has substantially the same configuration as the first and second reactor vessels 31 and 32. The first to third reactor vessels 31 to 33 are connected in parallel with each other by a plurality of piping paths, and a rotation operation in which the phosphorus recovery operation and reverse cleaning operation are interchanged with each other among the vessels is enabled.

The regeneration agent liquid introduction path L15 is connected to a regeneration agent liquid supply source 24 configured to supply the regeneration agent liquid of the adsorbent, and is also connected to the upper part of each of the first to third reactor vessels 31 to 33. A pump P3 is provided on the regeneration agent liquid introduction path L15, and the regeneration agent liquid is supplied from the supply source 24 to each of the first to third reactor vessels 31 to 33 through the path 15 by the drive of the pump P3.

The regeneration treatment water discharge path L16 is connected to the lower part of each of the first to third reactor vessels 31 to 33. The path L16 is configured in such a manner that when a valve is opened, the regeneration-treated water after the regeneration treatment is discharged from each of the first to third reactor vessels 31 to 33 through the regeneration treatment water discharge path L16.

The solid-liquid separation unit 21 is provided at a part between a raw water supply source 20 and each of the first to third reactor vessels 31 to 33, and is used to previously remove impurities (suspended solids and the like) contained in the water to be treated. As the solid-liquid separation unit 21, for example, a unit of the membrane separation system can be used. When the unit of the membrane separation system is used, it is necessary to take measures, e.g., separately providing a cleaning liquid discharge piping in order that the waste liquid concomitant with cleaning with an agent liquid for maintenance may not be mixed into each of the first to third reactor vessels 31 to 33. In this case, a reverse cleaning operation jointly employing liquid introduction to be carried out through each of the first to third reactor vessel liquid introduction paths L51 to L53 in each of the first to third rector vessels 31 to 33 may be carried out.

Further, when it is difficult to bring the phosphorus adsorbent into a phosphorus-absorbable state again by only the introduction of the desorption agent liquid through each of the first to third desorption agent liquid introduction paths L61 to L63, the regeneration agent liquid is introduced through the regeneration agent liquid introduction path L15, and an operation of maintaining the adsorption capability of the adsorbent of the packed bed 2 is carried out. As for the regeneration agent mentioned here, it is sufficient if an agent having higher anion-containing ingredient concentration than the desorption agent is used, and it is desirable that the regeneration agent be selected from substances which requires no separate discharge processing after passing of the agent liquid while excluding those ingredients having the possibility of causing deterioration or the like of the performance of the adsorbent. It is possible to use, for example, sodium chloride, and the like.

As described above, the phosphorus desorption agent liquid finally becomes the water to be treated of the phosphorus crystallization means in the crystallization means for acquiring the phosphate, and hence depending on the recovered phosphate configuration of the phosphorus, it is desirable that the phosphorus desorption agent liquid be selected from agent liquids capable of desorbing phosphorus, and having little influence on the phosphate crystallization. For this reason, when the phosphorus desorption capability of the phosphorus adsorbent is not restored to the predetermined state by only using the phosphorus desorption agent liquid, it is possible to use the phosphorus adsorbent again for phosphorus removal/recovery from the wastewater by separately passing the regeneration agent liquid of the phosphorus adsorbent through the reactor vessel.

Further, by previously removing the solids which are part of impurities contained in the water to be treated to be introduced into the reactor vessel containing the phosphorus adsorbent therein, it is possible to prevent the solids from being accumulated in the phosphorus adsorbent, and hence it is possible to prevent the impurities from being mixed into the passed phosphorus desorption liquid discharged from the phosphorus desorption means while preventing the load of the introduction means for the reactor vessel from increasing. Accordingly, it is possible to reduce the impurities mixed into the crystallization means for acquiring phosphate which is the recovered phosphoric matter, and prevent the impurities from being mixed into the recovered phosphoric matter.

According to the equipment 1A of this embodiment, it is possible to quickly eliminate the influence of the suspended solids in the water to be treated, and more appropriately carry out repetitive utilization of the phosphorus adsorbent, and hence it is possible to efficiently and appropriately carry out the operation of removing and recovering phosphorus from the wastewater.

(Third Embodiment)

Figure 3:
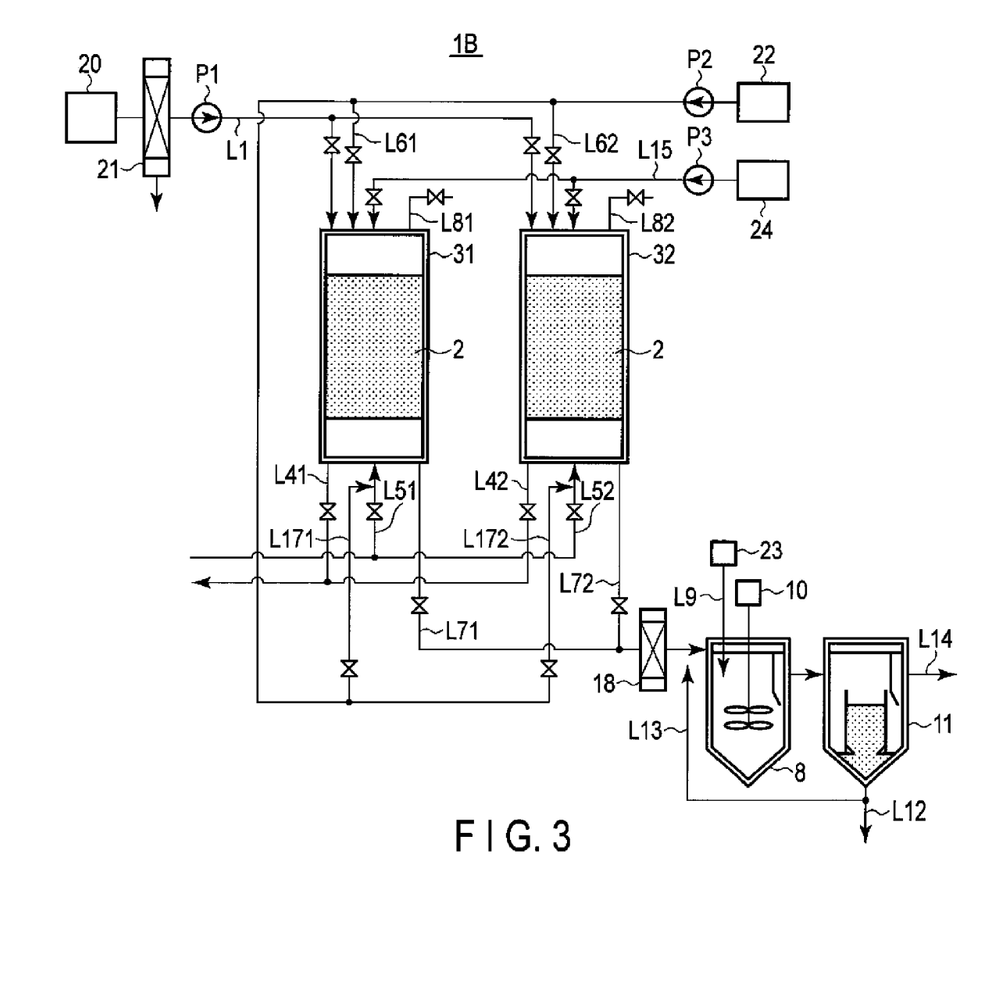
FIG. 3 is a configuration block diagram showing a water treatment equipment according to a third embodiment.

An equipment of a third embodiment will be described below with reference to FIG. 3. It should be noted that a description of parts of this embodiment overlapping the embodiments described previously will be omitted.

In the water treatment equipment 1B of this embodiment, first and second desorption agent liquid introduction paths L171 and L172 are respectively connected to first and second reactor vessel liquid introduction paths L51 and L52, and a desorption agent liquid passing treatment water solid-liquid separation unit 18 is provided on first and second desorption agent liquid passing treatment water discharge paths L71 and L72.

After the liquid held in each of first and second reactor vessels 31 and 32, and derived from the water to be treated is discharged, a liquid is introduced into each of the vessels 31 and 32 through each of the first and second reactor vessel liquid introduction paths L51 and L52 as an upward flow, and thereafter a desorption agent liquid of the phosphorus adsorbent is introduced to part of, or all of the above introduced liquid through each of the first and second desorption agent liquid introduction paths L171 and L172. By this agent liquid introduction, it is possible to prevent the concentration of the recovered phosphorus ingredient discharged from each of the first and second desorption agent liquid passing treatment water discharge paths L71 and L72 or the concentration of the desorption agent liquid from varying, and it is possible to further homogenize the quality of the water to be introduced into the crystallization vessel 8, and hence it is possible to appropriately carry out the phosphorus recovery operation.

Further, the desorption agent liquid passing treatment water solid-liquid separation unit 18 is provided on the first and second desorption agent liquid passing treatment water discharge paths L71 and L72, whereby it is possible to introduce the liquid into the crystallization vessel 8 while eliminating the solids mixed into the desorption agent liquid passing treatment water, and hence it is possible to eliminate the influence of the solids impurities on the crystallization vessel 8. Here, as for the desorption agent liquid passing treatment water solid-liquid separation unit 18, it is sufficient if a publicly known membrane separation unit or the like is used after taking measures such as a changeover of the cleaning process to be carried out in order that the waste liquid concomitant with cleaning with an agent liquid for maintenance of the membrane separation function may not be mixed into the crystallization vessel.

According to the equipment 1B of this embodiment, by making the liquid to be used by the means for introducing a liquid into the reactor vessel in which the phosphorus adsorbent that has already adsorbed phosphorus is held the phosphorus desorption agent liquid, it is possible to prevent the influence of the liquid to be introduced as the upward flow from being exerted on the phosphorus desorption liquid that has already been passed through the reactor vessel, and is discharged by the phosphorus desorption means. As a result of this, it is possible to prevent also the influence of the liquid to be introduced as the upward flow from being exerted on the crystallization means for acquiring phosphate which is the recovered phosphoric matter.

By previously arranging the solid-liquid separation means on the introduction path leading to the crystallization means for acquiring phosphate which is discharged from the phosphorus desorption liquid that has already been passed through the reactor vessel, and is discharged by the phosphorus desorption means, and which is the recovered phosphoric matter, it is possible to reduce the amount of impurities, and prevent the impurities from being mixed into the recovered phosphoric matter in the crystallization means.

According to the equipment 1B of this embodiment, it is possible to carry out a phosphorus recovery operation in which the influence of the solids flowing into the crystallization vessel configured to recover phosphorus is prevented from being exerted on the recovered phosphorus, and concentration of the agent liquid ingredient is prevented from varying, and hence it is possible to efficiently and appropriately carry out an operation of removing and recovering phosphorus from the wastewater.

According to the present invention, there is provided a water treatment equipment configured to carry out phosphorus recovery from the water to be treated, in which the agent liquid consumption amount is prevented from increasing while the impurities in the water to be treated are prevented from being mixed into the recovered phosphorus.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A water treatment equipment comprising:

first and second reactor vessels each including an adsorbent packed bed filled with a phosphorus adsorbent which adsorbs phosphorus contained in water to be treated;

a raw water supply source configured to supply the water to be treated into an upper part of each of the first and second reactor vessels;

a desorption agent liquid supply source configured to supply a phosphorus desorption agent liquid into the upper part of each of the first and second reactor vessels;

an introduction path which communicates with the raw water supply source and each of the first and second reactor vessels, configured to introduce the water to be treated into the upper part of each of the first and second reactor vessels;

a first discharge path configured to discharge, from the first reactor vessel, the water from which phosphorus has been removed;

a second discharge path configured to discharge, from the second reactor vessel, the water from which phosphorus has been removed;

a third discharge path communicating with a lower part of the first reactor vessel and configured to discharge first desorption agent liquid passing treatment water from the lower part of the first reactor vessel, wherein the first desorption agent liquid passing treatment water contains solid impurities;

a fourth discharge path communicating with a lower part of the second reactor vessel and configured to discharge second desorption agent liquid passing treatment water from the lower part of the second reactor vessel, wherein the second desorption agent liquid passing treatment water contains solid impurities;

a water passing mechanism configured to pass, through the adsorbent packed bed in each one of the first and second reactor vessels, the phosphorus desorption agent liquid which desorbs phosphorus from the phosphorus adsorbent which has adsorbed phosphorus;

a first solid-liquid separation mechanism communicating with the third discharge path and the fourth discharge path and configured to separate the solid impurities from the first and second phosphorus desorption agent liquid passing treatment water;

a crystallization vessel including a hydroxyapatite, into which the first phosphorus desorption agent liquid passing treatment water is introduced from the first reactor vessel via the third discharge path and the first solid-liquid separation mechanism, and into which the second phosphorus desorption agent liquid passing treatment water is introduced from the second reactor vessel via the fourth discharge path and the first solid-liquid separation mechanism;

an agent liquid supply source configured to inject a crystallization agent liquid into the crystallization vessel; and a stirrer configured to mix the first and second phosphorus desorption agent liquid passing treatment water and the crystallization agent liquid with each other in the crystallization vessel in order to bring the first and second phosphorus desorption agent liquid passing treatment water into contact with the crystallization agent liquid, wherein the first solid-liquid separation mechanism communicates with the third and fourth discharge paths to receive the first and second desorption agent liquid passing treatment water and provide liquid from which the solid impurities have been separated to the crystallization vessel.

2. The water treatment equipment according to claim 1, wherein the liquid introduced from the upward formation path into each of the first and second reactor vessels is cleaning water which back washes the solids contained in the water and accumulated in each of the first and second reactor vessels.

3. The water treatment equipment according to claim 1, wherein the water passing mechanism, and the agent liquid supply source are alternately switched between the first reactor vessel and the second reactor vessel to continuously remove and recover phosphorus in the water.

4. The water treatment equipment according to claim 1, wherein the desorption agent liquid supply source supplies an alkaline agent liquid as the phosphorus desorption agent liquid into each of the first and second reactor vessels.

5. The water treatment equipment according to claim 1, wherein the water supplied from the raw water supply source is a sludge-separated liquid discharged from a treatment process of sludge derived from biological water treatment.

6. The water treatment equipment according to claim 1, wherein the agent liquid supply source supplies a calcium hydroxide liquid as the crystallization agent liquid into the crystallization vessel, thereby bringing the calcium hydroxide liquid into contact with the first and second phosphorus desorption agent liquid passing treatment water, in addition to the hydroxyapatite in the crystallization vessel.

* * * * *

UNITED STATES PATENT AND TRADEMARK OFFICE
CERTIFICATE OF CORRECTION

PATENT NO. : 8,877,049 B2
APPLICATION NO. : 13/893079
DATED : November 4, 2014
INVENTOR(S) : Moniwa et al.

It is certified that error appears in the above-identified patent and that said Letters Patent is hereby corrected as shown below:

In the Claims,

Claim 3, column 12, line 29, change "and the agent liquid" to --and the desorption agent liquid--.

Signed and Sealed this
Seventh Day of April, 2015

Michelle K. Lee
*Director of the United States Patent and Trademark Office*